3,395,165
BIS-TRIPHENYL PHOSPHINE NICKEL TRICHLOROETHYLENE

Robert D. Feltham, Tucson, Ariz., assignor to The International Nickel Company, Inc., New York, N.Y., a corporation of Delaware
No Drawing. Filed Mar. 1, 1966, Ser. No. 530,796
2 Claims. (Cl. 260—439)

The present invention is directed to special nickel zero complex compounds.

It is an object of the present invention to provide special nickel zero compounds.

It is a further object of the invention to provide tertiary phosphine nickel complexes of chlorinated ethylene.

Other objects and advantages of the invention will become apparent from the following description.

Broadly stated, the present invention is directed to the tertiary phosphine nickel zero complex of trichloroethylene having the general formula $$[(X)_3P]_2Ni \cdot CCl_2CRCl$$

wherein R is a substituent from the group consisting of hydrogen, alkyl groups containing from 1 to 8 carbon atoms, a phenyl group, a methyl phenyl group, an ethyl phenyl group and a chlorophenyl group, and wherein X is a substituent from the group consisting of a phenyl group, a substituted phenyl group, e.g., methyl phenyl, ethyl phenyl, etc., and a naphthyl group. Compounds in accordance with the invention are exemplified by the compound bis-triphenyl phosphine nickel trichloroethylene. The hydrogen atom in the trichloroethylene moiety is replaceable with an alkyl group, a phenyl group, or a substituted phenyl group as set forth hereinbefore.

The new compound provided in accordance with the invention is a stable crystalline solid which is soluble in common organic solvents such as benzene but which is substantially insoluble in water. The chlorinated ethylene moiety in the molecule is believed from experimental evidence to be pi-bonded thereto.

The compounds contemplated in accordance with the invention may be produced with good yield of extractable product by reacting molar equivalents of bis-triaryl phosphine nickel dicarbonyl containing the selected aryl groupings with trichloroethylene or a substituted trichloroethylene at a temperature between about room temperature and about 100° C., preferably in an organic medium such as benzene. For example, bis-triphenyl phosphine nickel trichloroethylene was prepared by reacting molar equivalents of bis-triphenyl phosphine nickel dicarbonyl and trichloroethylene in benzene solution comprising about ten parts of benzene for each part of trichloroethylene under nitrogen, and heating to about 80° C. until gas evolution ceased under refluxing. The solution was cooled and a crude product was obtained as a precipitate. About two moles of carbon monoxide are recovered for each mole of bis-triphenyl phosphine nickel dicarbonyl employed in the initial reactant mixture. The crude product was extracted with diethyl ether. The ether extract was evaporated to minimum volume, cooled and crystallized to yield a golden yellow, crystalline solid which melted with decomposition at 172° C. The yellow solid was soluble in the following solvents in decreasing order of solubility: benzene, acetone, methanol, ethanol, diethyl ether, hexane. The solid decomposes in carbon tetrachloride. Material recrystallized from the aforementioned yellow solid by means of a mixture of chloroform and hexane in equal parts appeared as well-developed needles which were highly dichroic, appearing blue-white to red and green under polarized light. The infrared spectrum of the material was essentially that of a coordinated triphenyl phosphine. No absorption occurred at 2000 cm.$^{-1}$ indicating that carbon monoxide was absent. The elemental analysis established the stoichiometry as bis-triphenyl phosphine nickel trichloroethylene. The comparison of the analyzed values and the calculated values based upon $$C_{38}H_{31}P_2NiCl_3$$

is as follows:

| Element | Calculated Value, percent | Analyzed Value, percent |
|---|---|---|
| Carbon | 63.8 | 63.0 |
| Hydrogen | 4.4 | 4.5 |
| Phosphorus | 8.7 | 7.7 |
| Nickel | 8.2 | 8.5 |
| Chlorine | 14.9 | 15.5 |

The special nickel zero compounds provided in accordance with the invention are useful as catalysts for the carbonylation or polymerization of trichloroethylene, as lubricant additives, as heat or light stabilizers for plastics and polymers, particularly dark-colored materials, as ingredients in printing inks for printing on clear polymer films, etc. The compounds have also been found to exhibit nematocidal activity.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:
1. Tertiary phosphine nickel complexes of chlorinated ethylene having the formula

$$[(X)_3P]_2Ni \cdot CCl_2CRCl$$

wherein R is a substituent from the group consisting of hydrogen, alkyl groups containing from 1 to 8 carbon atoms, phenyl groups, methyl phenyl groups, ethyl phenyl groups, and chlorophenyl groups and X is a substituent from the group consisting of phenyl, substituted phenyl and naphthyl groups.

2. A tertiary phosphine nickel complex according to claim 1 wherein X is a phenyl group and R is hydrogen.

References Cited

Schrauzer: Advances in Organometallic Chemistry, vol. 2 (1964), Academic Press, New York, N.Y. p. 39.

TOBIAS E. LEVOW, *Primary Examiner.*

A. P. DEMERS, *Assistant Examiner.*